United States Patent [19]

Sillaman et al.

[11] Patent Number: 4,650,157
[45] Date of Patent: Mar. 17, 1987

[54] ANGLE BALL VALVE

[75] Inventors: Ronald L. Sillaman, Hunker; Gary C. Block, Carnegie, both of Pa.

[73] Assignee: Pittsburgh Brass Manufacturing Co., Irwin, Pa.

[21] Appl. No.: 781,687

[22] Filed: Sep. 30, 1985

[51] Int. Cl.[4] ............................ F16K 51/00; F16K 5/00
[52] U.S. Cl. ................................... 251/144; 251/315; 251/363
[58] Field of Search ............... 251/144, 361, 363, 315, 251/170, 304, 316

[56] References Cited

U.S. PATENT DOCUMENTS

| | | | |
|---|---|---|---|
| 2,768,806 | 10/1956 | Koehler | 251/363 |
| 3,367,623 | 2/1968 | Piel | 251/144 |
| 3,370,825 | 2/1968 | Scaramucci | 251/315 |
| 3,455,534 | 7/1969 | Scaramucci | 251/315 |
| 3,554,484 | 1/1971 | Gachot | 251/315 |
| 3,591,131 | 7/1971 | Carlson | 251/144 |
| 3,614,056 | 10/1971 | Alvarez | 251/144 |
| 3,661,355 | 5/1972 | Rawstron et al. | 251/144 |
| 4,137,935 | 2/1979 | Snowdon | 251/144 |
| 4,206,904 | 6/1980 | Dante | 251/315 |

Primary Examiner—A. Michael Chambers
Attorney, Agent, or Firm—Parmelee, Miller, Welsh & Kratz

[57] ABSTRACT

A ball valve for controlling upstream to downstream fluid flow, for example, from an apertured tank bottom, has a housing body for bolted-on mounting. The housing has a flow passageway therethrough that angles between its upstream and downstream portions and that is controlled by a valve ball rotatably positioned in and sealed-off within its upstream portion. A resilient, L or ladle-shaped annular gasket is positioned upstream at the joint between the valve housing and the tank bottom and in engagement with the ball adjacent an upstream end portion of its open-end flow passage and, in such a manner as to maintain the flow area of such passage. A rigid annular back-up ring fits and outwardly abuts within and against the gasket in such a manner as to provide a three-way pressure seal of the gasket in which the ball is sealed off with respect to the flow-passageway, the housing is sealed-off with respect to the ring, and the ring is sealed-off with respect to the tank bottom when the housing is bolt-secured to project from the tank bottom. An operating stem for the ball is provided with a key-like, operating end portion to axially receive a complementary bore of an operating handle.

11 Claims, 8 Drawing Figures

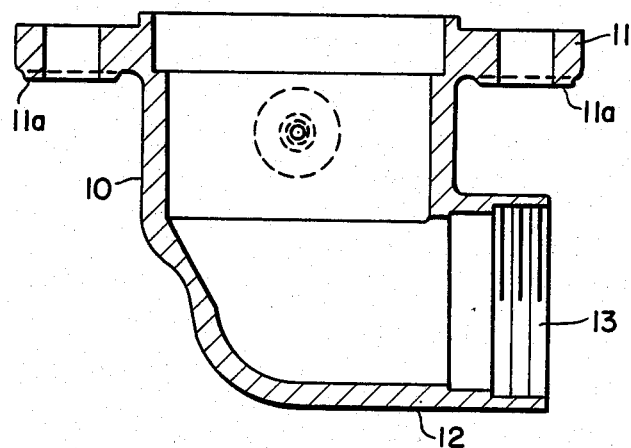
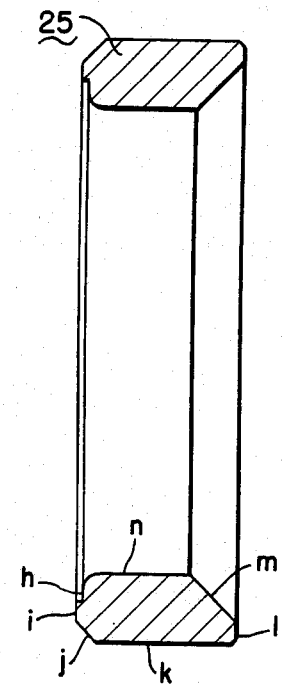
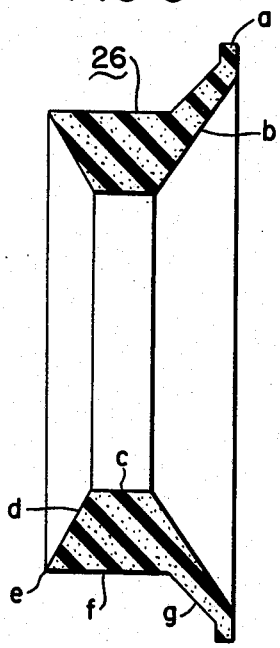
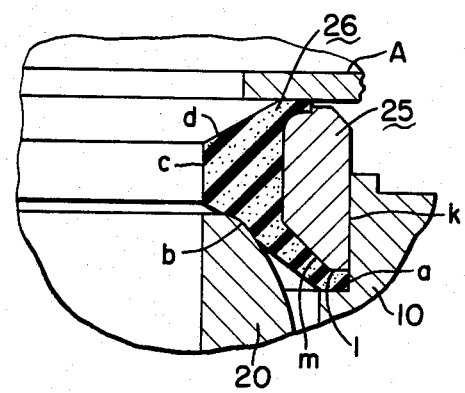
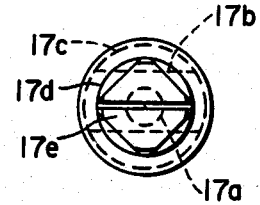
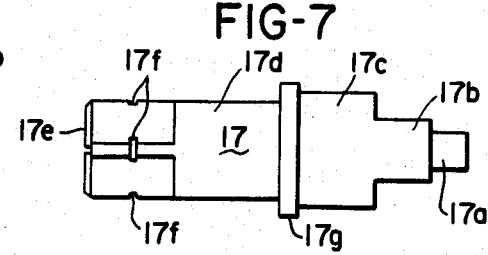

ANGLE BALL VALVE

This invention pertains to a new and improved ball valve which is adapted to be removably mounted with respect to a discharge opening, such as of an apertured tank bottom member for use in opening and closing-off downstream fluid flow therefrom. The construction is such that one gasket is effectively and easily replaceably mounted between the apertured member and a housing of the valve, and is pressure-distorted to seal-off two parts of the joint and to simultaneously seal-off the valve ball with respect to the fluid passageway through the valve housing.

Summarized briefly, the construction makes use of a unitary housing whose through-flow passageway has an in-flow to out-flow angular relation between its upstream and downstream end portions, and a valve ball is rotatably positioned for opening and closing movement within the upstream portion and adjacent the joint between the housing and the apertured plate or tank bottom member. The gasket is specially formed in a substantially "L" or ladle shape to receive a rigid, annular, back-up, pressure ring which has an intermediate position between valve housing and the apertured member, and which applies sealing force to one portion of the leg of the gasket to seal-off fluid flow between the through-flow passageway and the outer periphery of the ball adjacent an upstream end of a through flow passage of the ball. The ring, at the same time, applies pressure to a leg of the gasket to seal-off a joint between the housing and the ring and to an opposite side of the gasket to seal-off a joint between the ring and an upstream end portion of the valve housing and a tank apertured plate. This is accomplished in such a manner as that a three-way fluid sealing-off relation is attained.

BRIEF DESCRIPTION OF THE DRAWINGS

FIG. 3 is a side section in elevation through the housing of the construction of and on the same scale as FIGS. 1 and 2;

FIG. 4 is an enlarged cross-section through a rigid pressure ring shown particularly in FIG. 1;

FIG. 5 is an enlarged cross-section through a resilient gasket shown in FIGS. 1 and 6;

FIG. 6 is a fragmental section on the scale of FIGS. 4 and 5 showing the pressurized sealing relation of the gasket as effected by the pressure ring;

FIG. 7 is an enlarged side view taken longitudinally of the stem shaft of FIG. 1 that is employed for rotating the valve ball between its open and closed positions with respect to the fluid passageway of the valve housing;

And, FIG. 8 is an end view on the same scale as and taken from the left hand end of the stem shaft of FIG. 7.

DETAILED DESCRIPTION OF THE PREFERRED EMBODIMENT

Figure 1:
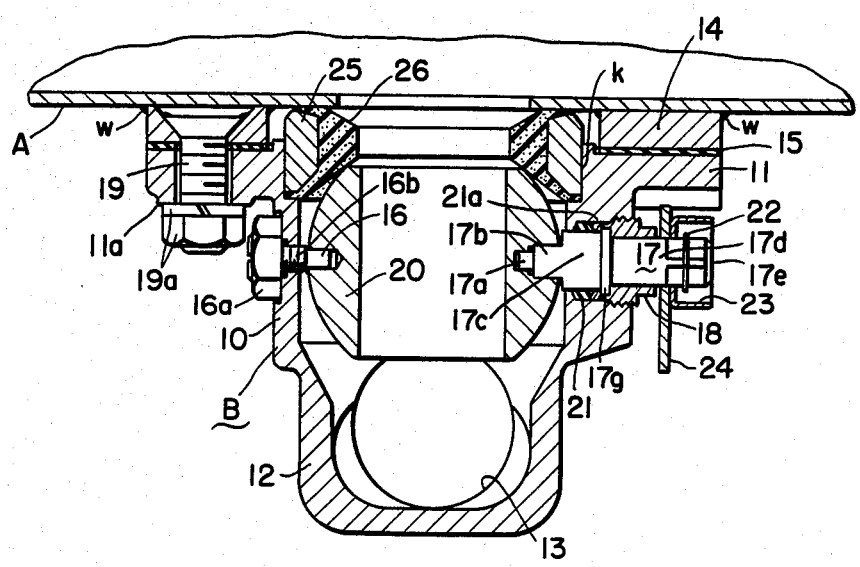
FIG. 1 is a vertical sectional view of a ball valve of the invention in a fully mounted and operating relation with respect to an apertured plate or member from which fluid or liquid is to be drawn-off from time to time.
Figure 2:
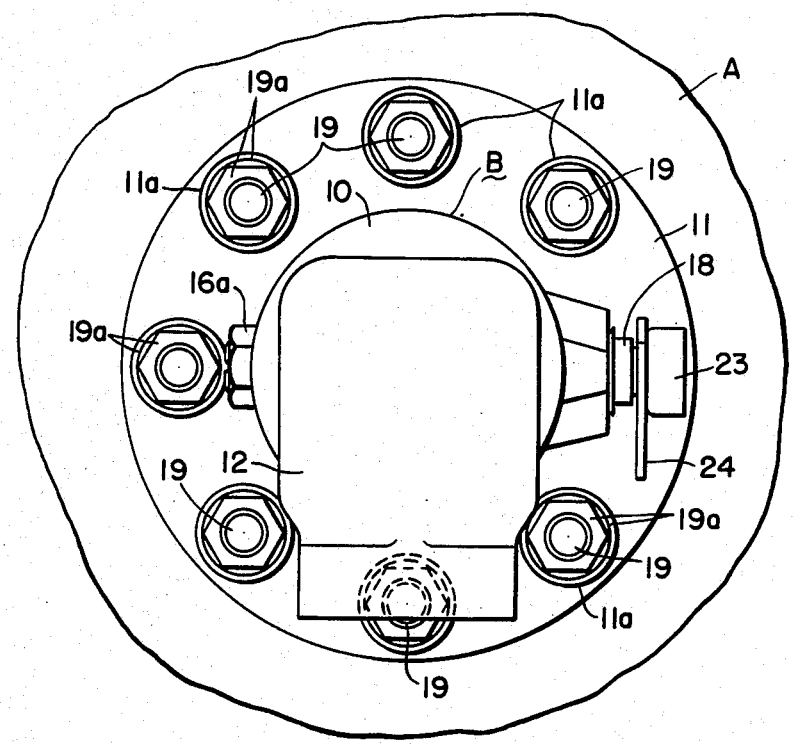
FIG. 2 is a bottom end view on the same scale as FIG. 1 of the complete assembly of such figure.

Referring to FIGS. 1 and 3, a valve housing 10 of angular shape is shown provided with an upstream, outwardly projecting, bolt-receiving mounting flange portion 11 and a lower, angularly extending downstream portion 12 that may be provided with female threading 13 for connection to a downstream delivery pipeline. The upstream and downstream end portions of the housing 10 provide a through-flow fluid passageway of angular shape. The flange portion 11, as shown in FIGS. 1, 2 and 3, is provided with thickened, circular mounting portions 11a for nut and lock washer assemblies 19a. The assemblies 19a cooperate with headed bolts 19 to secure the housing 10 in position at its upstream open end portion to a mounting flange 14 that is shown secured by weld metal w to an apertured, outflow plate or member A, such as the bottom of a storage tank. A planar or flat, annular sealing gasket 15 is positioned between the flange 14 and an upper, outwardly extending flange 11 of the valve housing 10 to provide a supplemental joint sealing action, but primarily to enable a tight face-to-face mounting of the housing flange 11 on the flange 14 without damage to the metal parts when full bolt mounting pressure is effected.

An elliptical, spheroid-shaped valve ball 20 is shown positioned within the upstream portion of the flow passageway through the housing 10 and for rotation therein in such a manner as to open and close-off its cylindrical flow passage with respect to the through-flow passageway of the housing 10. It will be noted that when a ball of such a shape is used, the elliptical portion of the ball spheroid will not make sealing contact with the annular gasket 26 when the ball is fully open to fluid flow and that, in its fully closed position, the spherical portion of the ball will make a highly effective positive sealing contact with the gasket. However, the improved gasket 26 may, if desired, be employed with a fully spherical-shaped ball wherein a sealing contact is maintained throughout. An adjustable trunnion or pin 16 is carried by one side of the housing 10 to rotatably align and support one side of the ball 20, and an oppositely positioned stem shaft 17 extends through an opposite side of the housing 10 to nonrotatably fit within the ball 20 and enable imparting rotating movement thereto. With particular reference to FIG. 1, pin 16 is of rounded shape in its positioning within the ball 20 and has an outer, slightly enlarged, male threaded portion 16b on which a position locking nut 16a is mounted. The trunnion 16, at its outer end, has a cross slot therein for enabling its longitudinal position to be adjusted by a screwdriver to provide a suitable free rotation of the ball 20. Such an adjustment is retained by tightening down the nut 16a.

The stem shaft 17, as shown particularly in FIGS. 1, 7 and 8, has a reduced diameter, circular, aligning end portion 17a which fits within the wall of the ball 20 in axial alignment with trunnion 16. The aligning end portion 17a terminates in a rectangular opening portion 17b that fits within a complementary slot in the side face of the ball 20 in such a manner that rotation of the shaft 17 effects rotative movement of the ball 20. The shaft 17 also has a pair of enlarged, cylindrical, housing mounting portions 17c and 17d of slightly different diameters. As shown particularly in FIG. 7, a cylindrical flange or collar 17g separates the two shaft portions 17c and 17d and rotates freely between gland nut 18 (see FIG. 1) and metal gland ring 21a. Gland nut 18, in conjunction with gland ring 21a compresses packing 21 within the housing 10 into a full gland sealing-off relation between the housing and the through extending shaft 17. Threaded mounting plug or gland nut 18 is removably screwed into the housing 10 and is provided with wrench flat outer end to enable it to be tightened axially against the metal gland ring 21a.

The outer end portion 17e of the shaft 17 has, as indicated, a group of axially extending slots (see FIGS. 1 and 7), and a spring-like retaining ring 22 that fits within circular grooves 17f to receive a similarly apertured or keyed bore of an operating arm or handle (not shown). A cup-shaped bracket 23 is mounted on the shaft end portion 17e in abutment with a stop plate 24 to limit swing of an operating arm to open and closed positions of the ball 20.

A yieldable or resilient annular gasket 26, of a resin or plastic material, such as tetrafluorethylene (TFE) or a fluorocarbon polymer with embedded glass particles to add strength to its body, of novel shape and use is employed as a sole means for sealing-off the ball 20 with respect to the flow-passageway through the valve housing and for simultaneously sealing-off the valve housing 10 and the apertured member or plate A. As shown, a pressure ring 25 of metal or other suitable rigid material is used to move the gasket 26 into and retain it in a pressurized, elastically distorted sealing-off position; the ring 25, in effect, constitutes an intervening connecting part between the member A and the valve housing 10.

As employed, the gasket 26 serves as a three-way seal, first the above-mentioned ball seal, also as a seal for a joint defined between one side of the ring and the apertured member A, and a joint defined between the downstream side of the ring and an upstream end of the valve housing. FIG. 5 shows the unpressured normal "L", ladle or dipper shape of the gasket 26. It has an inner base portion c of planar cross-section and an opposed outer base portion f also of planar section that define a relatively thick main body. One side face b inclines or slopes outwardly from the base portion c to and beyond the portion f to provide an outwardly extending leg portion g that terminates in a foot or sealing lip portion a of substantially rectangular section. Opposite side face d also slopes outwardly from base portion c to define a widened outer base portion f. The side face d terminates at the base portion f to define a relatively sharp edge e.

The pressure ring 25 of annular shape, as shown particularly in FIGS. 4 and 6, has an inner, cylindrical base portion n from which extends a side face m that slopes or inclines in a diverging relation outwardly therefrom to terminate in a shortened flat face portion 1. Opposite side face i of the pressure ring 25 is planar or flat and is cutout towards an inner base portion n of planar cross section to provide a circular slot h. As shown in FIG. 6, the slot h has a rounded inner edge and provides a receiving, flow-in slot for the sharp edge e of the gasket 26 when the housing 10 is tightened-down by the bolt and nut assemblies 19 and 19a to a secured relation with respect to the apertured member and or its mounting flange 14. This provides an effective seal for the joint defined between the apertured plate member A and the ring 25. On the other hand, side face portions m and l of the ring 25 serve to seal-off the joint between the ring 25 and the valve housing 10 by pressure applied to the sealing foot or lip a. Finally, as shown, the side face b of gasket 26 is forced into a rounded sealing-off engagement with the outer side of the ball 20 adjacent its upstream end. The side face i of pressure ring 25, is connected to outer base portion k of planar cross-section by an outwardly declining side face portion j. As shown in FIG. 1, an outer base portion k is positioned in abutment with an inside, inset ledge portion of the housing mounting flange 11.

The above construction provides a simple but highly practical form of a ball valve which only requires only one sealing gasket and an associated pressure ring for effecting its sealing action from the standpoint of three joints, two of which are involved between the valve housing 10 and the apertured member on which it is to be secured and from which it is to receive fluid or liquid into an upstream end portion of its housing. It is a simple matter to replace the gasket 26 by merely removing the nut and washer assemblies 19a. To prevent tampering with the valve, the operating end portion 17e of its stem shaft 17 is provided with what may be termed a key type of construction, such that only a complementary, keyed type of handle may be effectively used therewith to rotate the ball 20 between its open and closed positions with respect to the angular-shaped through-extending fluid passageway in the housing 10.

We claim:

1. In an improved ball valve having a housing with upstream and downstream opening-defining end portions and a through passageway therebetween for cooperative aligned mounting one of its end portions on an apertured member, a resilient annular gasket adapted to be positioned between the one end portion of said housing and the apertured member, said gasket having a base portion defining an open passageway between the apertured member and the housing, a valve ball having spheroid and elliptical shaped outer wall portions and a flow-passageway therethrough, means rotatably mounting said ball for movement within the housing into and out of fluid flow-through relation between the upstream and downstream end portions of the housing, and said means also being adapted to move said elliptical shaped wall portion of said ball into non-sealing alignment with said gasket when its flow-passageway is in a flow-through relation and to move said spheroid-shaped wall portion of said ball into alignment with and into a full fluid-flow sealing-off relation with said gasket when the flow-passageway of the ball is fully closed.

2. In an improved ball valve as defined in claim 1, wherein said gasket is of ladle shape having an outwardly extending and diverging side leg portion that at its inner reaches is adapted to align with and to effect a sealing-off engagement with said spheroid-shaped wall portion of said ball.

3. In a ball valve having a housing with upstream and downstream opening ends therein and a through passageway therebetween for cooperative aligned mounting at its upstream end on an apertured member or the like, a valve ball having a through passageway therein and rotatably mounted for opening and closing alignment with respect to an upstream portion of the flow passageway of said housing, a ladle-shaped resilient annular gasket adapted to be positioned between the upstream portion of said housing and the apertured member, said gasket having a base portion defining an open upstream passageway from said apertured member into said housing, said gasket having a leg portion that extends from and is sloped in an outwardly divergingly inclined relation with respect to said base portion and that terminates in an outer offset sealing edge that has an opposed relation with said leg portion, a gasket mounting ring of substantially rigid material adapted to abut against an outer side of said base portion of said gasket, said ring having an outwardly diverging side face adapted to abut against an inner face of said leg portion of said gasket and having at an opposite side face that is outwardly divergingly inclined to abut against an adjacent portion of said gasket and, upon an application of mounting pressure on said ring to distort said outer sealing edge and force said leg portion into sealing-off engagement between the aperatured member and said valve housing and, at the same time, force said base portion into fluid sealing-off engagement with said ball.

4. In a ball valve construction for mounting on an apertured tank bottom, an annular flange adapted to be weld-secured about the apertured tank bottom, a valve housing provided with a flanged upstream open end portion, bolts carried by said annular flange and cooperating with said flanged upstream end portion to secure said valve housing on said annular flange to project therefrom, said housing having a downstream open end portion connected by a through passageway to said flanged upstream open end portion thereof, a valve ball having a flow-passage positioned in the through passageway for opening and closing rotation therein,
- a resilient annular gasket having substantially L-shaped cross-sectional body and adapted to be positioned between the apertured tank bottom and the upstream open end portion of said flanged upstream open end portion to both seal-off the joint between said annular flange and the flanged upper end portion of said housing as well as the periphery of said ball with respect to the through passageway, said gasket also having:
- an annular inner peripheral base face portion and an opposed outer peripheral base face portion of wider dimension than said inner base face portion, each of said base face portions being of substantially planar section, a sealing side face extending in an outwardly diverging sloped relation between said inner and outer base face portions and adapted to be held in sealing engagement with the tank bottom, an opposite sealing side face extending in an outwardly diverging sloped relation from said inner base face portion and having a leg projecting outwardly beyond said outer base face portion, said opposite sealing side face being adapted to be held in sealing engagement with said valve housing,
- a rigid back-up ring adapted to engage said outer base face portion and an adjacent inner side of said leg to simultaneously force said gasket into the above-set forth sealing-off engagements,
- and bolt means securing said valve housing on said annular flange and simultaneously applying force to said ring in such a manner as to force said gasket into and retain it in the above set forth fluid sealing-off engagements.

5. A ball valve construction as defined in claim 3 wherein, said downstream open end portion of the housing is connected in an angular relation with respect to said fluid passageway, and said passageway is open from said downstream open end portion along the outer extent of said ball up to the mounted position of said gasket, an adjustable trunnion pin is carried by one side of side housing to rotatably engage and support said ball within said passageway, an opposed operating stem is secured within said ball and rotatably carried by an opposite side of said housing in an aligned relation with respect to said trunnion pin, sealing gland and plug means operatively removably positions said stem in a sealed-off relation with respect to said passageway within said housing and projects outwardly from said housing, and said stem has means for removably receiving an operating tool for rotating said ball valve between its open and closed positions with respect to said passageway.

6. In an improved ball valve having a housing with upstream and downstream opening-defining end portions and a through passageway therebetween for cooperative aligned mounting one of its end portions on an apertured plate member, a ladle-shaped resilient annular gasket adapted to be positioned between one end portion of said housing and the apertured member and having an inner base portion defining an open passageway between the apertured member and the housing, a valve ball having a round-shaped outer wall and a fluid passageway therethrough, said ball being rotatably mounted within the housing for alternately positioning its fluid passageway between a flow-through and a closed-off relation between the upstream and downstream end portions of said housing, said gasket having a pair of opposed outwardly diverging side faces and a leg portion that extends from and is sloped in an outwardly diverging relation from one of said side faces and that terminates in an outer sealing-off edge that is adapted to abut said housing, an opposite side face of said gasket being adapted to abut against the apertured member, a gasket mounting ring of substantially rigid material adapted to abut against an outer side of said inner base portion and against said opposite side faces and said leg portion of said gasket, said ring having one outwardly diverging side face abutting against said leg portion of said gasket and having an opposite side face abutting against said opposite side face of said gasket, said ring, upon an application of mounting pressure applied thereto between the apertured member and the housing, being adapted to move said leg portion into a sealing-off relation between the housing and said ring and said opposite side face of said gasket into a sealing-off relation between the apertured member and said ring and, at the same time, to force said base portion of said gasket into an aligned engagement with said ball.

7. In an improved ball valve as defined in claim 6 wherein, said side leg of said gasket terminates in a sealing lip portion of substantially rectangular section that is moved into sealing engagement between said ring and the housing upon the application of mounting pressure applied to said ring.

8. In an improved ball valve as defined in claim 7 wherein, the housing has an offset ledge portion, and said ring has an opposed flat face portion between which said sealing lip portion is positioned.

9. In an improved ball valve as defined in claim 6 wherein, said ring has a circular slot portion between its inner base portion and its opposite side face, and said opposite side face of said gasket is adapted to flow into said slot portion when said opposite side face of said gasket is moved into a sealing-off relation between the apertured member and said ring.

10. In an improved ball valve as defined in claim 6 wherein, said gasket is of plastic material with embedded glass particles therein.

11. In a sealing construction for a ball valve, a resilient annular sealing gasket having a cross section of substantially L-shape, said gasket having an inner fluid-passageway-defining peripheral base face portion and an opposed outer peripheral base portion of wider extent, said gasket having a pair of opposed side faces extending in an outwardly diverging relation between said inner and said outer base face portions, an elongated side leg extending from one side face of said outer base portion in an outwardly diverging relation and terminating in a sealing lip, a substantially rigid back-up ring member having an inner peripheral base face portion of a width substantially corresponding to the width of said outer base face portion of said gasket, said ring member having an opposed outer peripheral base face portion of a wider extent than its said inner base face portion, said ring member having an inwardly declining side face that is adapted to be aligned with and to distort an outer side edge of the other opposed side face of said gasket into a sealing position outwardly therealong, and said ring also having an opposite side face that declines inwardly into said outer base face portion of said gasket to force said one side face and said side leg of said gasket outwardly into sealing positions.

* * * * *